June 29, 1954

L. O. CARLSEN ET AL 2,682,204

MACHINE TOOL

Filed April 1, 1953

INVENTORS
LEONARD O. CARLSEN
BY ADOLPH H. KRASTEL

Richard W. Treverton

June 29, 1954
L. O. CARLSEN ET AL
2,682,204
MACHINE TOOL
Filed April 1, 1953
3 Sheets-Sheet 3
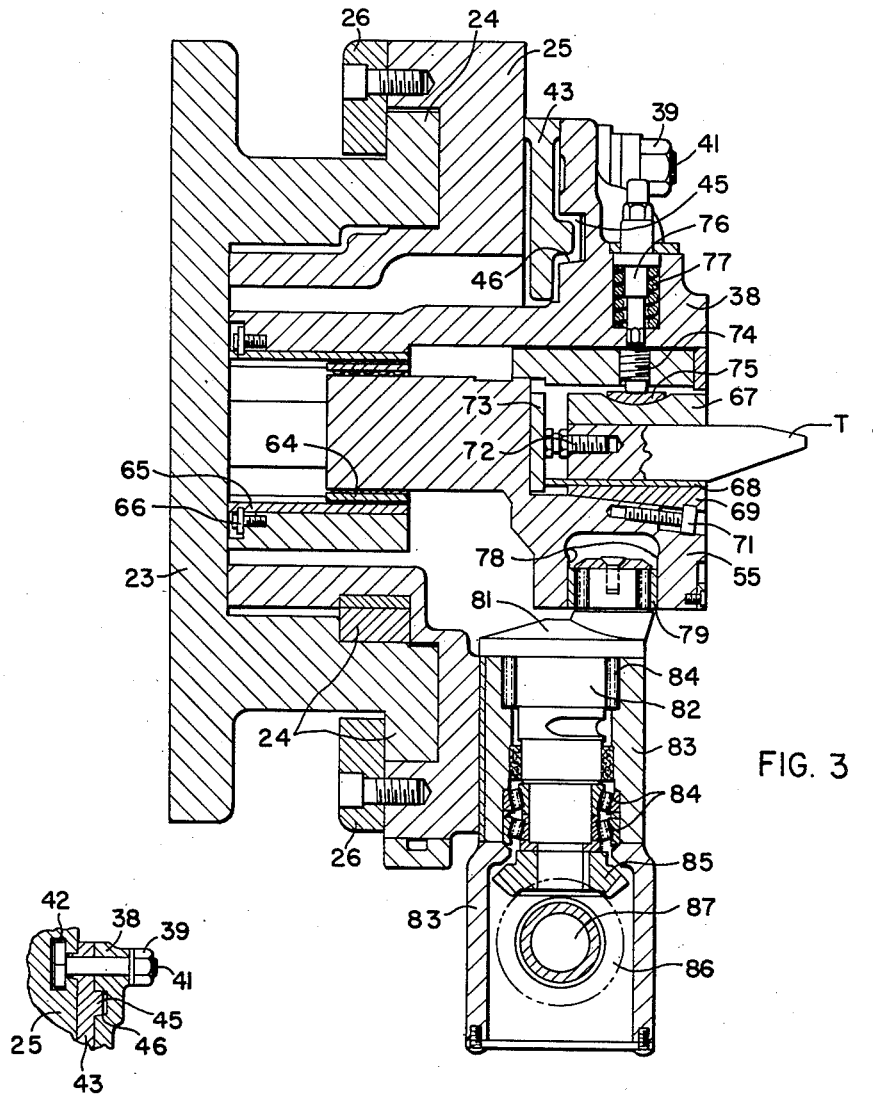
FIG. 3
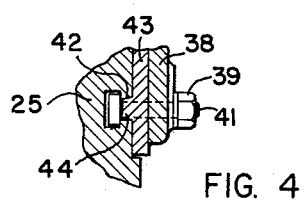
FIG. 5
FIG. 4
*INVENTORS*
LEONARD O. CARLSEN
BY ADOLPH H. KRASTEL
*Richard W. Treverton*

Patented June 29, 1954

2,682,204

UNITED STATES PATENT OFFICE 2,682,204

MACHINE TOOL

Leonard O. Carlsen, Rochester, and Adolph H. Krastel, Irondequoit, N. Y., assignors to The Gleason Works, Rochester, N. Y., a corporation of New York Application April 1, 1953, Serial No. 346,148

6 Claims. (Cl. 90—55)

1

The present invention relates to a machine, such for example as a gear cutting machine, having a reciprocating cutting tool which cuts on one stroke and is withdrawn from cutting position during the return stroke. More particularly, the invention relates to an improved mechanism for adjustably supporting the tool and effecting its motion between its cutting and withdrawn positions.

According to the invention the tool is mounted in a carrier which is movable on a supporting member to carry the tool between such cutting and withdrawn positions, the supporting member in turn being mounted upon a reciprocatory tool slide. The supporting member is adjustable both angularly and rectilinearly upon the slide, to thereby enable proper positioning of the cutting edge of the tool relative to the slide; and for this purpose the supporting member preferably is mounted for rectilinear adjustment upon another member that is angularly adjustable upon the slide about an axis parallel to the path of the tool's advance and withdrawal motion.

This motion is imparted to the tool carrier by a crank whose shaft is journaled in the tool slide, the crank being oscillated by a drive shaft that is also journaled in the slide and that extends parallel to the path of reciprocation of the slide. The axis of the shaft of the crank is at right angles to both the path of reciprocatory motion of the tool slide and to the axis about which the tool carrier's supporting member is adjustable angularly, and the eccentric portion of the crank is arranged to act upon surfaces of the tool carrier that are also perpendicular to the angular adjustment axis. Accordingly the crank produces the same withdraw and advance of the tool carrier irrespective of the position of adjustment of the supporting member upon the slide. This is a substantial advantage inasmuch as it permits the oscillating drive shaft for the crank to be connected to its actuating mechanism by a simple telescoping connection, thereby eliminating the need for universal joints which have heretofore been employed in similar drives.

The novel arrangement of parts, including the elimination of universal joints, permits the tool to be held firmly clamped to the tool slide by the crank throughout the cutting stroke, the crank being in dead center position at this time. Accordingly the invention provides a rigid supporting mechanism for the tool, enabling heavy cuts to be taken without vibration or chatter.

The foregoing and other objects and advantages of the invention will appear from the following detailed description made with reference to the drawings, wherein:

Fig. 3 is a vertical sectional view taken in the planes indicated by section line 3—3 of Fig. 1;

Figure 1:
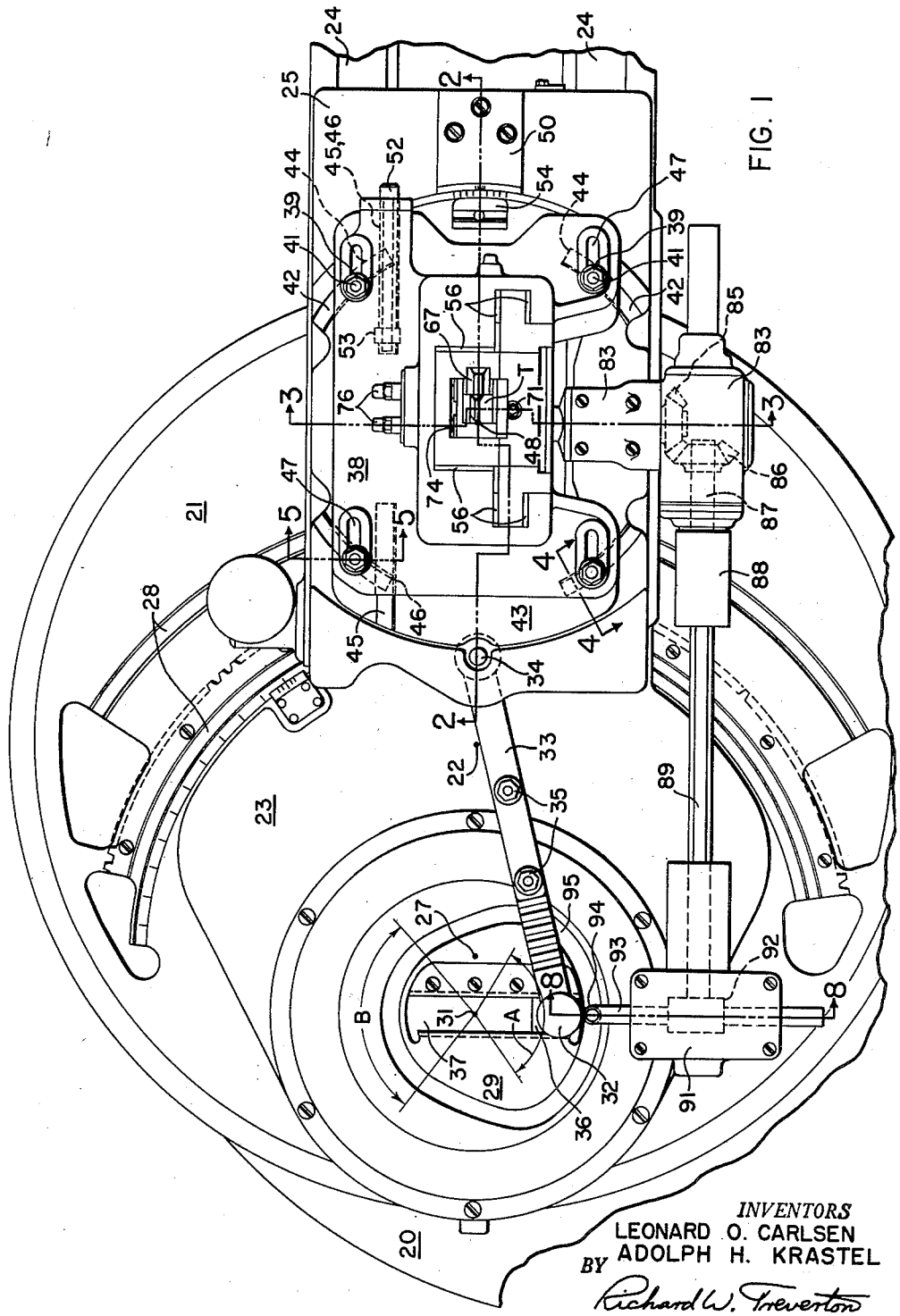
Fig. 1 is a front elevation of the portion of a bevel gear cutting machine which includes the tool supporting and drive mechanism.
Figure 2:
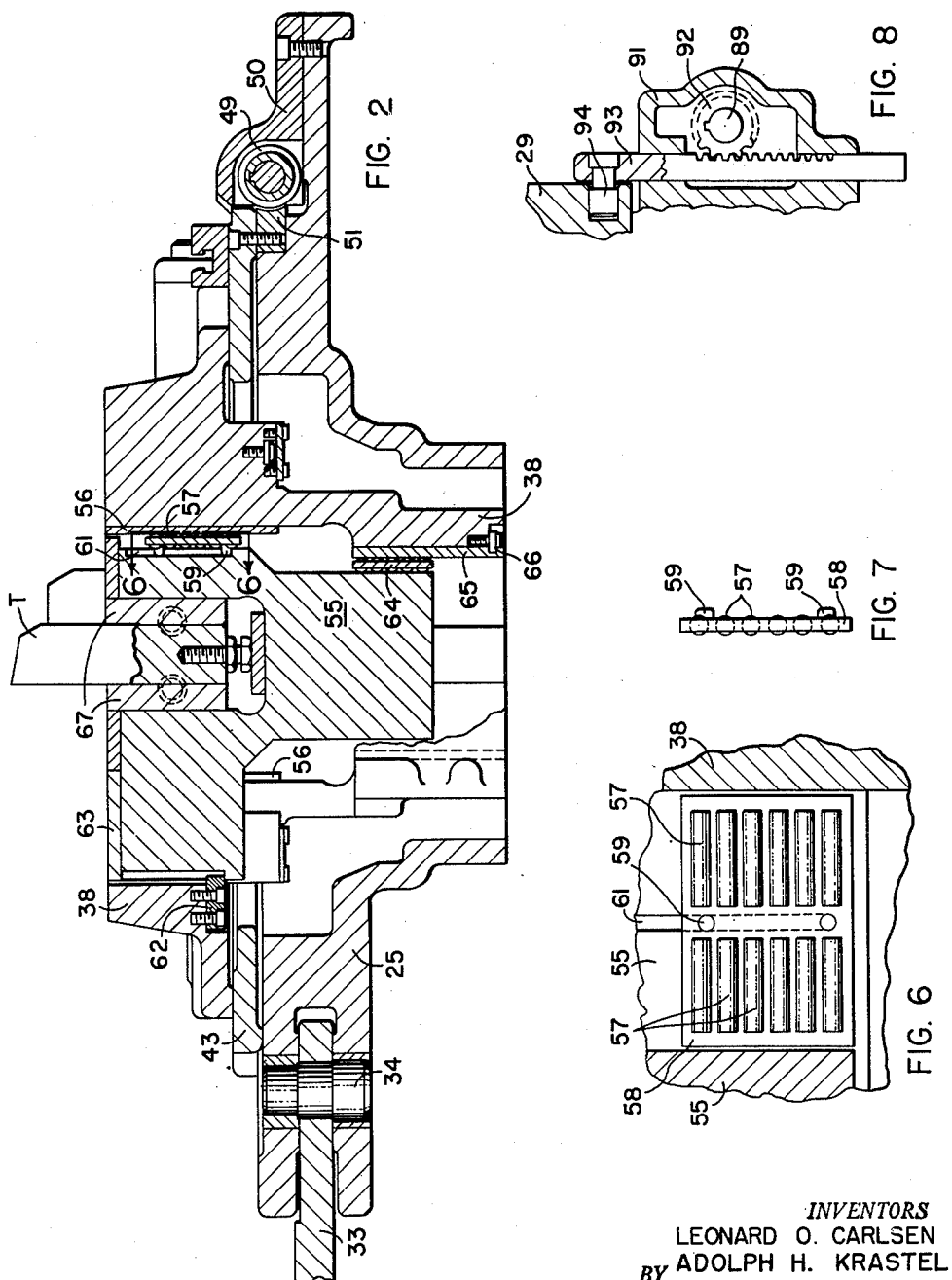
Fig. 2 is a horizontal sectional view taken in the planes indicated by section line 2—2 of Fig. 1.

Figs. 4 and 5 are detail sectional views taken in the planes respectively indicated by section lines 4—4 and 5—5 of Fig. 1;

Fig. 6 is a detail view taken in the plane indicated by section line 6—6 of Fig. 2;

Fig. 7 is a side elevation of a roller bearing shown in Fig. 6; and,

Fig. 8 is a detail sectional view taken in the plane indicated by section line 8—8 of Fig. 1.

The bevel gear cutting machine shown in Fig. 1 is of the general type disclosed in Patent No. 1,616,439 granted February 8, 1927, to A. H. Candee and M. H. Johanson. It includes a housing 20 on which a cradle 21 is mounted for oscillation about an axis 22. Carried by the cradle is an arm 23 having ways 24 along which a tool slide 25 is reciprocable, the slide being held to the ways by gibs 26. The arm 23 is adjustable to various positions upon the cradle about an axis designated 27, being secured to the cradle by bolts anchored in arcuate T-slots 28 that are concentric with axis 27.

The tool slide is reciprocated by a crank 29 rotating on axis 31, the pin 32 of the crank being connected to the slide by a pitman 33. The pitman is connected to the slide by a pivot pin 34 and is adjustable in length by being made in two sections whose contiguous surfaces are serrated and held interlocked by bolts 35. The crank pin 32 is carried by a block 36 and the stroke of the slide is varied by adjusting this block along a slot 37 in the face of the crank cheek 29. A tool head 38 constitutes the supporting member for the carrier of the cutting tool T. It is adjustably secured to the slide by nuts 39 threaded onto bolts 41 whose heads are held in arcuate T-slots 42 (Figs. 1, 4 and 5) in the slide. A plate 43 is interposed between the tool head and the slide, and has arcuate tongues 44 slidable in the T-slots. It also has straight tongues 45 (Figs. 1, 3 and 5) slidable in grooves 46 formed on the inner face of the forward portion of tool head, these grooves being parallel to slots 47 (Fig. 1) in the carrier through which pass the shanks of bolts 41.

Upon loosening of nuts 39, the plate 43 and the tool head may be adjusted as a unit angularly about the center or axis, designated 48, of the arcs defined by slots 42; and the tool head may be adjusted rectilinearly relative to the plate in the direction of grooves 46 and slots 47. The angular adjustment is effected by rotating, by means of a suitable wrench, a worm 49 (Fig. 2) that is journaled in a bracket 50 secured to the slide, the worm meshing with a worm wheel segment 51 secured to the plate. This adjustment is facilitated by suitably calibrated indicia, shown in Fig. 1, that is provided on the adjacent surfaces of the bracket and plate. The rectilinear adjustment is accomplished by turning a screw 52 that is journaled in the tool head 38 and is threaded to a nut 53 carried by plate 43. With the aid of a suitable gage, not shown, that may be positioned between a fixture 54 on the plate 43 and the point of tool T, the rectilinear adjustment may be employed to bring this point into coincidence with the axis 48 about which plate 43 is adjustable.

The carrier for tool T is designated 55. As shown, it is slidable on roller bearings in the tool head 38 in the direction of axis 48. Six sets of such bearings engage the front portion of the carrier, the rollers of each set bearing on flat races 56 (Figs. 1 and 2) that are secured to the head 38. As shown in Figs. 6 and 7, each set has a plurality of rollers 57 and a retaining cage 58 for them. The cage has projections 59 that are slidable in a groove 61 in the carrier 55 and are adapted to engage the end walls of the groove to prevent possible overtravel of the rollers and cage as the carrier moves between its advanced or cutting limit position and its withdrawn or idle position. In the advanced position, shown in Figs. 2 and 3, shoulders on the carrier abut the rear surface of a stop 62 secured to the head 38. Two such stops 62 are provided, one at each side of the carrier, but only one of them appears in the drawings. A chip guard plate 63 is secured to the front face of the carrier and in its withdrawn position this guard approaches but does not abut the front faces of the stops 62. The tail portion of the carrier is substantially rectangular in vertical cross-section and each of its upper, lower and opposite side surfaces engages a roller bearing set 64 similar to the sets which support the front of the carrier. The rollers of sets 64 roll on the surfaces of the carrier and also on flat races 65 which are secured to the head 38 by keys 66.

The tool T is supported in a recess in the front of the carrier 55 within an inverted U-shaped holder 67. The tool is adjusted to the proper vertical position by means of a shim 68 and an adjustable wedge 69. The latter may be adjusted by means of a screw 71 that is threaded to the carrier. The tool is adjusted horizontally (in the plane of of Fig. 3) by means of a screw 72 whose head abuts a plate 73 secured to the carrier. After this screw is adjusted the tool is set in place and then clamped by set screws 74 that are threaded into the carrier and bear upon pads 75 that seat on the holder 67. The set screws are turned to tighten or loosen the tool by means of studs 76 that are journaled for both axial motion and rotation in head 38 and are axially aligned with the set screws when the carrier is in its advanced position. When not being used the studs are pressed upwardly, out of engagement with the set screws, by springs 77. To turn either of the set screws a wrench is applied to the related stud, and the latter is pressed downwardly, against the resistance of its spring 77, to cause its lower hexagonal end to engage in a complementary recess in the set screw.

In the bottom of the carrier is a recess having opposed plane surfaces 78 perpendicular to adjustment axis 48. Between these surfaces is a roller 79 mounted on anti-friction bearings upon the pin of a crank 81 whose shaft 82 is journaled for rotation in a bracket 83. The latter constitutes a part of the slide 25 and contains roller bearings 84 which support the crank shaft 82 with its axis parallel to plane surfaces 78 and intersecting the adjustment axis 48. A bevel gear 85 secured to the lower end of the crank shaft meshes with a bevel pinion 86 fixed to a tubular shaft 87 that is also journaled in bracket 83. By means of a coupling 88 this shaft is connected to a telescoping shaft 89 that is journaled in a bracket 91 mounted on arm 23. A spur pinion 92 secured to shaft 89 within bracket 91 meshes with a rack 93 (Figs. 1 and 8) that is slidably supported by the bracket. Mounted on the upper end of the rack is a follower roller 94 engaging in a continuous cam track 95 formed in the face of crank cheek 29.

The cam track 95 is so shaped that during the cutting stroke of the tool, while crank 29 turns through the arc A in Fig. 1, the rack 93 is held stationary in its lower position, shown. At the end of this stroke and the beginning of the return stroke, while the motion of the tool slide is reversing, the rack is moved upwardly. During the return stroke, while the crank turns through arc B, the rack is held stationary in its uppermost position. Then, at the end of the return stroke and the beginning of the cutting stroke, it is again moved downwardly. Through the pinion 92, shafts 89, 87, and bevel gears 86, 85, the crank is rotated approximately one-half turn during upward motion of the rack, i. e. at the end of the cutting stroke, to effect tool withdrawal motion of the carrier 55, this being motion to the right as the carrier is viewed in Fig. 3. In this way the tool is withdrawn clear of the cut in the work piece during the return stroke of the slide. Before the next cutting stroke, the downward motion of the rack causes the crank 81 to turn, in the opposite direction, to its dead-center position shown in Fig. 3 wherein the crank pin lies in the common plane of axis 48 and the axis of shaft 82. The stops 62 are of such thickness that in this position the carrier 55 is firmly clamped between the crank roller 79 and the stops 62 so that the tool T is solidly connected with the slide.

It will be understood that by the rectilinear adjustments heretofore described the point of the tool may readily be brought into coincidence with axis 48, as shown in Fig. 1, and that by adjustment of plate 43 about this axis the tool slide clearance angle may be set as desired. When the tool is replaced by a new tool or after being sharpened, repetition of some or all of these adjustments may be necessary. With the arrangement of parts described, wherein the surfaces 78 are parallel to the axis of the crank shaft and perpendicular to axis 48, it will be seen that the action of the crank 81 and the motion of the carrier 55 resulting from the crank's action are not affected by any of the adjustments. Moreover the parallel relation of the shafts 87, 89 to the path of motion of the tool slide is not disturbed by such adjustments, so that no universal joints or the like are required in these shafts.

It will be understood further that the foregoing disclosure is made by way of illustration and example of the inventive principles involved, and not by way of limitation; and that various changes in the form and arrangement of the parts may be made without departing from the spirit of the invention or from the scope of the appended claims.

What is claimed is:

1. In a machine tool, a reciprocatory tool slide, a first member adjustable angularly on the slide about an axis perpendicular to the path of tool slide reciprocation, a second member adjustable rectilinearly on the first member in a plane perpendicular to the axis of adjustment, a tool carrier movable on the second member substantially in the direction of said axis of adjustment, the tool carrier having oppositely facing surfaces perpendicular to said axis of adjustment, a crank journaled on the tool slide on an axis also perpendicular to said axis of adjustment, and a bearing carried by the eccentric portion of the crank and engaging both of said surfaces.

2. In a machine tool, a reciprocatory tool slide, a first member adjustable angularly on the slide about an axis perpendicular to the path of tool slide reciprocation, a second member adjustable rectilinearly on the first member in a plane perpendicular to the axis of adjustment, a tool carrier movable on the second member substantially in the direction of said axis of adjustment, the tool carrier having a recess with opposite surfaces perpendicular to said axis of adjustment, and a crank journaled on the tool slide on an axis also perpendicular to said axis of adjustment, the eccentric portion of the crank being confined in said recess between said opposite surface.

3. In a machine tool, a reciprocatory tool slide and a guide therefor, a member carried by and adjustable relative to the slide angularly about an axis perpendicular to the path of tool slide reciprocation, a tool carrier mounted for reciprocation on the member substantially in the direction of the axis of adjustment, a drive shaft journaled for angular oscillation in the tool slide about an axis parallel to said path of tool slide reciprocation, a driven shaft journaled in the tool slide at an angle to the drive shaft and connected to the drive shaft for angular oscillation thereby, and means connecting the driven shaft to the tool carrier for reciprocating the latter on said member, upon oscillation of the driven shaft, in any position of angular adjustment of said member.

4. In a machine tool, a reciprocatory tool slide and a guide therefor, a first member adjustable angularly on the slide about an axis perpendicular to the path of tool slide reciprocation, a second member adjustable rectilinearly on the first member in a plane perpendicular to the axis of adjustment, a tool carrier mounted for reciprocation on the second member in the direction of said axis of adjustment, a drive shaft journaled for angular oscillation in the tool slide about an axis parallel to said path of tool slide reciprocation, a driven shaft journaled in the tool slide at an angle to the drive shaft and connected to the drive shaft for angular oscillation thereby, and means connecting the driven shaft to the tool carrier for reciprocating the latter on the second member, upon oscillation of the driven shaft, in any position of angular adjustment of the first member and rectilinear adjustment of the second member.

5. In a machine tool, a reciprocatory tool slide, a member carried by and adjustable relative to the slide angularly about an axis perpendicular to the path of tool slide reciprocation, a tool carrier movable on the second member substantially in the direction of said axis of adjustment, the tool carrier having oppositely facing surfaces perpendicular to said axis of adjustment, a crank journaled on the tool slide on an axis which also is perpendicular to said axis of adjustment, and a bearing carried by the eccentric portion of the crank and engaging both of said surfaces.

6. In a machine tool, a reciprocatory tool slide, a member carried by and adjustable relative to the slide angularly about an axis perpendicular to the path of tool slide reciprocation, a tool carrier movable on the second member substantially in the direction of said axis of adjustment, the tool carrier having a recess with opposite surfaces perpendicular to said axis of adjustment, and a crank journaled on the tool slide on an axis also perpendicular to said axis of adjustment, the eccentric portion of the crank being confined in said recess between said opposite surfaces.

No references cited.